United States Patent
Ohno et al.

(10) Patent No.: US 9,986,381 B2
(45) Date of Patent: May 29, 2018

(54) INFORMATION PROCESSING DEVICE, METHOD FOR CONTROLLING SAME, AND PROGRAM

(71) Applicant: Sharp Kabushiki Kaisha, Osaka (JP)

(72) Inventors: Takuto Ohno, Osaka (JP); Yu Yumura, Osaka (JP); Kyohei Eguchi, Osaka (JP); Shuji Daioku, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days. days.

(21) Appl. No.: 15/513,511

(22) PCT Filed: Sep. 17, 2015

(86) PCT No.: PCT/JP2015/076547
§ 371 (c)(1),
(2) Date: Mar. 22, 2017

(87) PCT Pub. No.: WO2016/052237
PCT Pub. Date: Apr. 7, 2016

(65) Prior Publication Data
US 2017/0311124 A1    Oct. 26, 2017

(30) Foreign Application Priority Data

Sep. 29, 2014  (JP) .................. 2014-199356

(51) Int. Cl.
*H04W 4/02* (2018.01)
*G01C 21/20* (2006.01)
*G01C 21/34* (2006.01)

(52) U.S. Cl.
CPC .......... *H04W 4/023* (2013.01); *H04W 4/027* (2013.01); *H04W 4/028* (2013.01); *H04W 4/029* (2018.02); *G01C 21/20* (2013.01); *G01C 21/3423* (2013.01)

(58) Field of Classification Search
CPC .... H04L 2209/80; H04W 4/02; H04W 4/027; H04W 4/025; H04W 36/36
See application file for complete search history.

(56) References Cited

U.S. PATENT DOCUMENTS

| | | | | |
|---|---|---|---|---|
| 8,624,725 | B1 * | 1/2014 | MacGregor | H04W 4/026 340/539.13 |
| 2012/0136529 | A1 * | 5/2012 | Curtis | G01C 21/20 701/32.2 |
| 2015/0172867 | A1 * | 6/2015 | Otsuka | H04W 4/02 455/456.3 |

FOREIGN PATENT DOCUMENTS

JP    2011-174806 A    9/2011

* cited by examiner

*Primary Examiner* — Kwasi Karikari
(74) *Attorney, Agent, or Firm* — ScienBiziP, P.C.

(57) ABSTRACT

An information processing device provides information regarding a specific place only in a case where it is highly likely that a user needs the information. A positional relationship information generating section (14) presents information indicating a positional relationship between a current position of the user and the specific place in a case where a predetermined length of time or greater has elapsed between (i) a time point at which a position determining section (11) determines that the user is staying in a specific position and (ii) a time point at which a movement determining section (12) detects the user having moved from the specific position.

4 Claims, 3 Drawing Sheets

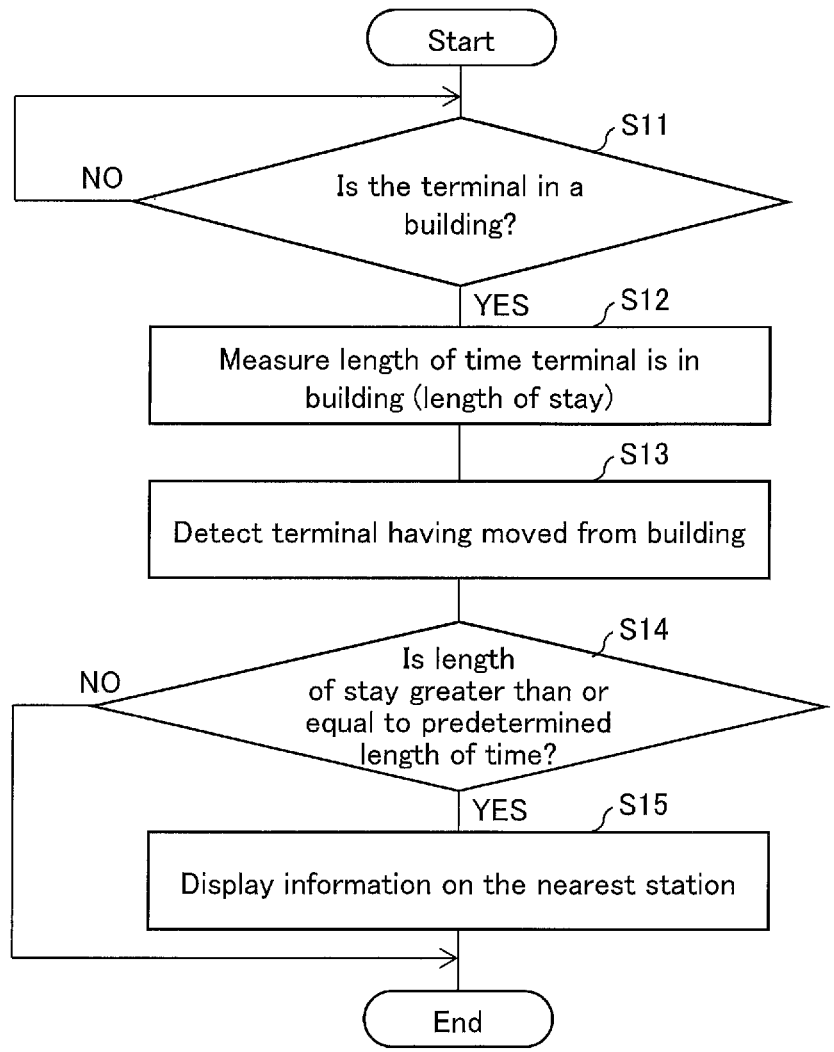

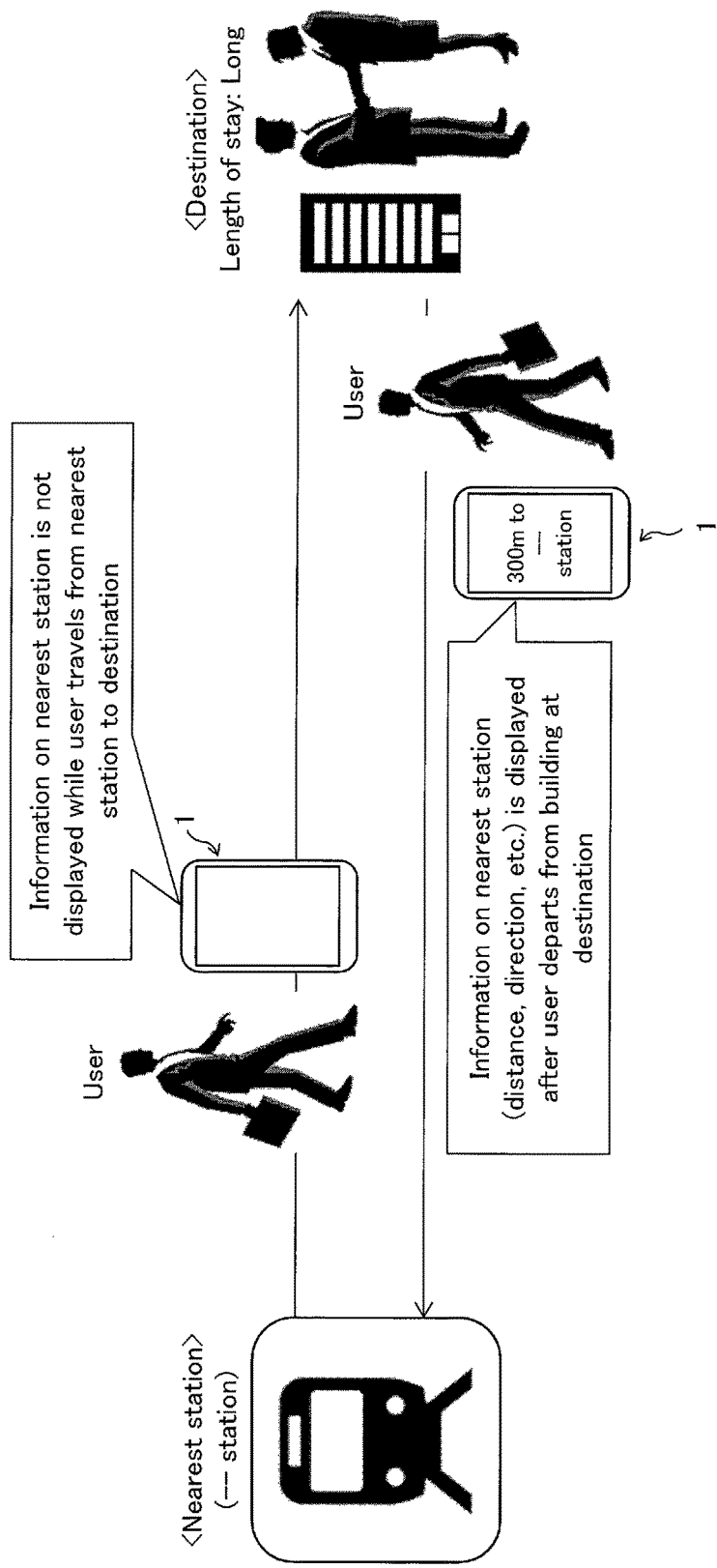

INFORMATION PROCESSING DEVICE, METHOD FOR CONTROLLING SAME, AND PROGRAM

TECHNICAL FIELD

The present invention relates to an information processing device, a method of controlling an information processing device, and a program.

BACKGROUND ART

A conventional information processing device presents information regarding a specific place (including a facility and a location) which is in a vicinity of the information processing device (and of a user holding the same). The information regarding the specific place specifically refers to information indicating a positional relationship between (i) a current position of the user and (ii) the specific place. The user can more easily get to the specific place by referring to the information indicating the positional relationship.

Patent Literature 1 discloses an example of the information processing device. A mobile terminal device disclosed in Patent Literature 1 is configured to (i) search for a target object which is (a) within a predetermined distance from a current position of the mobile terminal device and (b) within a predetermined range of deviation from a direction in which the mobile terminal device is travelling, and then (ii) display information about the target object for which the search was conducted. Examples of the target object (i.e., specific place) disclosed in Patent Literature 1 include a river, a coastline, a road, a railroad, a lake, a mountain, and a theme park.

CITATION LIST

Patent Literature

[Patent Literature 1]
Japanese Patent Application Publication, Tokukai, No. 2011-174806 (Publication date: Sep. 8, 2011)

SUMMARY OF INVENTION

Technical Problem

Note, however, that the user does not constantly need information relating to a specific place. For example, it is believed that the user does not need information indicating the positional relationship between the user's current position and the specific place, while (i) the user is travelling toward a destination (other than the specific place) and (ii) the user is staying at that destination.

Unfortunately, the conventional information processing device presents information regarding the specific place (the target object of Patent Literature 1) regardless of whether or not the user needs the information.

The present invention has been made in view of the above problem, and an object of the present invention lies in providing, for example, an information processing device which is capable of presenting information regarding a specific place only in a case where it is highly likely that a user needs the information.

Solution to Problem

In order to solve the above problem, an information processing device in accordance with an aspect of the present invention includes: a first determination section configured to determine whether or not a user is staying at a specific position; a detection section configured to detect the user having moved from the specific position; a second determination section configured to determine whether or not a predetermined length of time or greater has elapsed between a first time point and a second time point, the first time point being a time point at which the first determination section determines that the user is staying at the specific position, the second time point being a time point at which the detection section detects the user having moved from the specific position; and an information presenting section configured to present information in a case where the second determination section determines that the predetermined length of time or greater has elapsed between the first time point and the second time point, the information indicating a positional relationship between a current position of the user and a specific place.

Advantageous Effects of Invention

An aspect of the present invention brings about, an effect of making it possible to provide information regarding a specific place only in a case where it is highly likely that a user needs the information.

BRIEF DESCRIPTION OF DRAWINGS

FIG. 2 is a flow chart showing how a control section of the mobile terminal device, in accordance with Embodiment 1, processes displaying of positional relationship information.

FIG. 3 is a diagram showing whether or not the mobile terminal device 1 displays positional relationship in (i) a case where the user is heading from the nearest station toward a destination and (ii) a case where the user has left the destination and is heading from the destination toward the nearest station.

DESCRIPTION OF EMBODIMENTS

Embodiment 1

Figure 1:
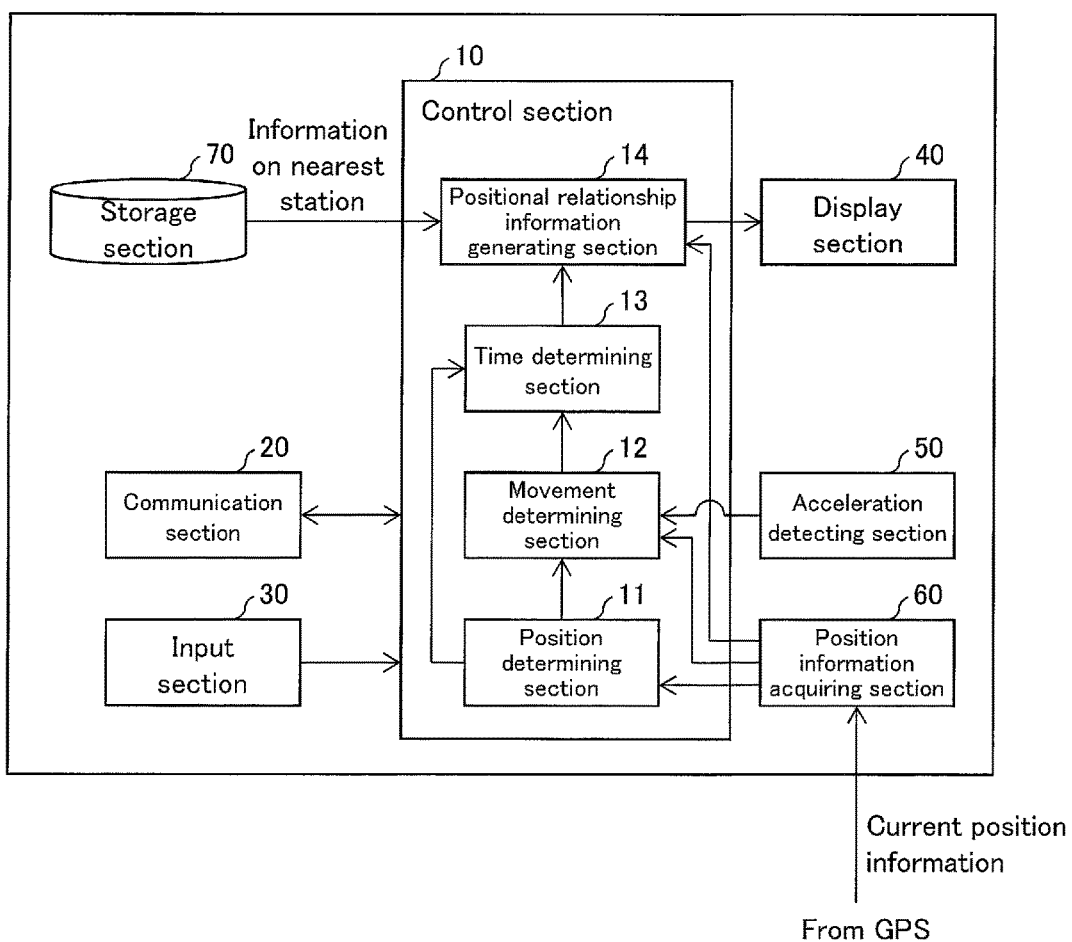
FIG. 1 is a block diagram illustrating a configuration of a mobile terminal device in accordance with Embodiment 1.

The following description will discuss, in detail. Embodiment 1 of the present invention with reference to FIG. 1 through FIG. 3.

(Configuration of Mobile Terminal Device 1)

The following description will, discuss, with reference to FIG. 1, a configuration of a mobile terminal device 1 in accordance with Embodiment 1. FIG. 1 is a block diagram illustrating a configuration of the mobile terminal device 1. As illustrated in FIG. 1, the mobile terminal device 1 includes a control section 10 (information processing device), a communication section 20, an input section 30, a display section 40, an acceleration detecting section 50, a position information acquiring section 60, and a storage section 70.

The control section 10 controls each of the sections of the mobile terminal device 1 and carries out various types of information processing for operating the mobile terminal device 1. In particular, the control section 10 carries out processing for controlling the display section 40 to display information (positional relationship information) indicating a positional relationship between (i) a current position of the user (and of the mobile terminal device 1) and (ii) a specific place. Examples of the specific place include facilities, such as a railroad station building, as well as locations, such as a bus stop.

Examples of the positional relationship information encompass (i) a rectilinear distance between (a) a current position of the user (and the mobile terminal device 1) and (b) a specific place, (ii) a direction of the specific place as seen from the current position of the user (and the mobile terminal device 1), and (iii) information such as a map indicating a route from the current position of the user to the specific place.

In Embodiment 1, the specific place is a station nearest to the current position of the user (nearest station). As such, during processing for displaying the positional relationship information, the control section 10 controls the display section 40 to display information indicating the positional relationship between (i) the current position of the user and (ii) the nearest station. Note, however, that the specific place is not particularly limited to being the nearest station. The specific place can be, for example, a famous spot or a restaurant. A configuration of the control section 10 and processing for displaying information on the nearest station will be described later in detail.

The communication section 20 is used to make a communication between the mobile terminal device 1 and an external device, which communication can be wired (for example, via a telephone line) or wireless (for example, via Bluetooth [registered trademark], a mobile phone network, or WiFi [registered trademark]).

The input section 30 is used in a case where the user operates the mobile terminal device 1. The input section 30 sends, to the control section 10, information indicating content of an entered input. Examples of the input section 30 encompass a touch panel, a hard key, an audio input device, and a motion sensor.

The display section 40 is realized by, for example, a liquid crystal display. The acceleration detecting section 50 is configured to detect an acceleration of the mobile terminal device 1. The acceleration detecting section 50 sends, to a movement determining section 12, acceleration information indicating the acceleration thus detected. Specific examples of the acceleration detecting section 50 include acceleration sensors such as a gyroscopic sensor and a magnetometer.

The position information acquiring section 60 is configured to obtain information on a current position of the mobile terminal device 1 (this information hereinafter also referred to as "current position information"). Specifically, the position information acquiring section 60 receives, from a GPS (Global Positioning System) satellite, a signal containing the current position information. The position information acquiring section 60 transmits the current position information obtained thusly to (i) a position determining section 11 (first determination section) and (ii) a movement determining section 12 (detection section) (described later). Note here that there are cases where the mobile terminal device 1 is, for example, inside a building and, as a consequence, the position information acquiring section 60 is unable to receive the current position information from the GPS satellite. In such cases, the position information acquiring section 60 (i) obtains acceleration information from the acceleration detecting section 50 and then (ii) calculates the current position of the mobile terminal device 1 based on the acceleration information obtained thusly. Alternatively, the position information acquiring section 60 can be configured to notify the position determining section 11 of the inability to obtain the current position information.

The storage section 70 is configured to store information necessary for the control section 10 to carry out various control functions. In particular, the storage section 70 stores information on the nearest station, which information indicates a position of the nearest station. The storage section 70 is realized by, for example, a memory.

(Configuration of Control Section 10)

The following description will discuss, in detail, a configuration of the control section 10 with reference to FIG. 1. As illustrated in FIG. 1, the control section 10 includes the position determining section 11, the movement determining section 12, a time determining section 13, and a positional relationship information generating section 14 (information presenting section).

The position determining section 11 determines, in accordance with the current position information received from the position information acquiring section 60, whether or not the mobile terminal device 1 is inside a building (specific position). Specifically, the position determining section 11 compares (i) the current position of the mobile terminal device 1 with (ii) a position of a building (which is registered in a database, for example) in a vicinity of the mobile terminal device 1. In a case where the current position of the mobile terminal device 1 matches a position of a certain building, the position determining section 11 determines that the mobile terminal device 1 is in the building. Alternatively, the position determining section 11 can be configured to determine that the mobile terminal device 1 is in a building in a case where the position information acquiring section 60 cannot acquire the current position information. The position determining section 11 supplies, to the movement determining section 12 and the time determining section 13 (second determination section), a determination result indicating that the mobile terminal device 1 is in a building.

Upon receiving, from, the position, determining section 11, the determination result indicating that the mobile terminal device 1 is in a building, the movement determining section 12 (i) obtains current position information from the position information acquiring section 60 and (ii) acquires the acceleration information from the acceleration detecting section 50. The movement determining section 12 then determines, in accordance with the current position information and the acceleration information obtained thusly, whether or not the user (and the mobile terminal device 1) has moved from the building.

More specifically, the movement determining section 12 first determines whether or not an acceleration of the mobile terminal device 1, as detected by the acceleration detecting section 50, is zero (or, alternatively, whether or not the acceleration is greater than or equal to a predetermined value). In a case where the acceleration of the mobile terminal device 1 is not zero, the movement determining section 12 then determines whether or not the mobile terminal device 1 is distanced from the position of the building by a predetermined distance (for example, 300 m) or greater. In a case where the mobile terminal device 1 is distanced from the position of the building by the predetermined distance or greater, the movement determining section 12 then determines that the user has moved from the building. The movement determining section 12 subsequently supplies, to the time determining section 13, a determination result indicating whether or not the user has moved from the building.

Note that the acceleration of the mobile terminal device 1 being not zero triggers the movement determining section 12 determining whether or not the user has moved from the building. In a case where the acceleration of the mobile terminal device 1 is zero, it is highly likely that the user (and the mobile terminal device 1) has not moved from the building. As such, in the above configuration, the movement determining section 12 determines whether or not the user has moved from the building only in a case where the acceleration of the mobile terminal device 1 is not zero.

Note that the trigger is not essential. In a case where the trigger is not employed, the mobile terminal device 1 does not need to include the acceleration detecting section 50. In such a case, however, even in a case where the acceleration of the mobile terminal device 1 is zero, the movement determining section 12 is configured to determine whether or not the user has moved from the building. As such, a configuration which employs the trigger requires less energy consumption for calculations involved in the determination and is, therefore, preferable to a configuration which does not employ the trigger.

As described above, the determining whether or not the user has moved from the building is not limited to be triggered by the acceleration of the mobile terminal device 1 being not zero. In a first alternative configuration, the determining whether or not the user has moved from the building can be triggered by the number of steps taken by the user being greater than or equal to a predetermined number, the movement determining section 12 calculating the number of steps taken based on the acceleration of the mobile terminal device 1. In a second alternative configuration, the determining whether or not the user has moved from the building can be triggered by a distance traveled by the user exceeding a predetermined distance of travel, the movement determining section 12 calculating the distance traveled based on a preset step length and the number of steps. In the first and second alternative configurations, the movement determining section 12 determines whether or not the mobile terminal device 1 is distanced from the building by the predetermined distance (for example, 300 m) or greater in a case where the number of steps taken or the distance traveled (each being calculated in accordance with the acceleration of the mobile terminal device 1) has exceeded a predetermined value (number of steps or distance of travel).

At a time point (first time point) at which the time determining section 13 receives, from the position determining section 11, a determination result indicating that the mobile terminal device 1 is in a building, the time determining section 13 begins measuring a length of time during which the mobile terminal device 1 is in the building. Subsequently, at a time point (second time point) at which the time determining section 13 receives, from the movement determining section 12, a determination result indicating that the user has moved from the building, the time determining section 13 calculates how long the mobile terminal device 1 was in the building (length of stay). The time determining section 13 then determines whether or not the length of stay is greater than or equal to a predetermined length of time. The time determining section 13 supplies, to the positional relationship information generating section 14, a determination result indicating whether or not the length of stay is greater than or equal to the predetermined length of time.

Note that the predetermined length of time is not limited to a particular length. There are, however, cases in which the user enters a building such as a convenience store and stays therein for a short length of time (approximately 5 minutes to 10 minutes). In such cases, the user is unlikely to head toward the nearest station after leaving the convenience store or other such building, and it is therefore unnecessary to display the positional relationship information. As such, the predetermined length of time can be set to a somewhat long length of time, such as 30 minutes.

In a case where the positional relationship information generating section 14 receives, from the time determining section 13, a determination result indicating that the length of stay is greater than or equal to the predetermined length of time, the positional relationship information generating section 14 generates the positional relationship information and then supplies it to the display section 40 for its displaying (presenting). More specifically, the positional relationship information generating section 14 first obtains the information on the nearest station from the storage section 70. The positional relationship information generating section 14 also obtains the current position information from the position information acquiring section 60. Thereafter, the positional relationship information generating section 14 uses the information on the nearest station and the current position information to generate the positional relationship information. The positional relationship information, which is generated by the positional relationship information generating section 14, can be outputted in the form of audio, instead of being displayed by the display section 40.

The user can more easily get to the nearest station, by viewing the positional relationship information (including [i] a distance from the current position of the user to the nearest station and [ii] the direction of the nearest station as seen from the current position of the user) displayed thusly. The positional relationship information is particularly useful in a case where the user is in an unfamiliar area. For example, there are cases in which, for business purposes, a user takes a train or other such means of transportation to visit a building, in an unfamiliar area, in which building a client is located. In such cases, after the user has left the building, the user can get to the nearest station, without becoming lost, by referring to the positional relationship information.

(Processing for Displaying Positional Relationship Information)

The following description will discuss, with reference to FIG. 2 and FIG. 3, how the control section 10 processes displaying of the positional relationship information. FIG. 2 is a flow chart showing a flow of processing for displaying the positional relationship information. FIG. 3 is a diagram showing whether or not the mobile terminal device 1 displays positional relationship information in (i) a case where the user has arrived at the nearest station and is heading from the nearest station toward a destination and (ii) a case where the user has left the destination and is heading from the destination toward the nearest station.

As illustrated in FIG. 2, in the processing for displaying the positional relationship information, the position determining section 11 first determines whether or not the mobile terminal device 1 is in a building (S11, first determination step). In a case where the mobile terminal device 1 is not in a building ("No" in step S11), the position determining section 11 repeats step S11. In the case illustrated in FIG. 3, the mobile terminal device 1 is not in a building (i) while the user is travelling from the nearest station to the destination and (ii) while the user is travelling from the destination to the nearest station. While the user is in a building at the destination, however, the mobile terminal device 1 is also in the same building.

In a case where the position determining section 11 determines that the mobile terminal device 1 is in a building ("Yes" in step S11), the time determining section 13 begins measuring the length of time (length of stay) during which the mobile terminal device 1 is in the building (S12).

Thereafter, the movement determining section 12 detects the mobile terminal device 1 having moved from the building (S13, detection step). In the case shown in FIG. 3, once the user (i) has left the building at the destination after staying there and (ii) is heading toward the nearest station, the movement determining section 12 detects the mobile terminal device 1 having moved from the building.

Next, the time determining section 13 determines whether or not the length of time (length of stay) during which the mobile terminal device 1 was in the building is greater than or equal to the predetermined length of time (S14, second determination step). In the case shown in FIG. 3, the length of stay is the length of time from (i) the user's arrival at the building at the destination to (ii) the user's departure from the building. In a case where the length of stay is less than the predetermined length of time ("No" in step S14), the control section 10 controls the display 40 to skip displaying the positional relationship information, and the processing for displaying the positional relationship information ends.

However, in a case where the length of stay is greater than or equal to the predetermined length of time ("Yes" in step S14), the positional relationship information generating section 14 controls the display section 40 to display the positional relationship information (S15, information presenting step). In the case shown in FIG. 3, the positional relationship information is displayed by the display section 40 of the mobile terminal device 1 after the user has left the building at the destination.

Once this step is carried out, the processing for displacing the positional relationship information ends.

Embodiment 2

The following description will discuss Embodiment 2 of the present invention. Note that, for convenience, members having functions identical to those of the respective members described in Embodiment 1 are given respective identical reference numerals, and a description of those members is omitted here.

The mobile terminal device 1 of Embodiment 1 is configured to display the positional relationship information in a case where the user (and the mobile terminal device 1) has stayed in a building for the predetermined length of time or greater. That is, the positional relationship information is displayed regardless of what sort of building the user has stayed in.

In a case where the user has previously stayed in the same building, however, it is believed that the user has an understanding of an area around the building. In such a case, the user does not therefore need the positional relationship information in order to travel from the building to the nearest station.

In order to address this, a mobile terminal device 1 in accordance with Embodiment 2 displays positional relationship information in a case where (i) the user (and the mobile terminal device 1) has stayed in a building for a predetermined length of time or greater and (ii) the user has not previously visited the building for a predetermined period (for example, thirty days). To put it another way, the mobile terminal device 1 in accordance with Embodiment 2 skips displaying the positional relationship information in a case where the user has previously visited a building during the predetermined period, even if the user has stayed in the building for the predetermined length of time or greater. In Embodiment 2, information indicating a list of buildings, which the user has previously visited during the predetermined period, is stored in, for example, the storage section 70.

Embodiment 3

The following description will discuss Embodiment 3 of the present invention. Note that, for convenience, members having functions identical to those of the respective members described in previous embodiments are given respective identical reference numerals, and a description of those members is omitted here.

In Embodiment 1, the movement determining section 12 is configured to (i) obtain the acceleration information from the acceleration detecting section 50 and (ii) in a case where the acceleration of the mobile terminal device 1 is not zero, determine whether or not the user (and the mobile terminal device 1) has moved from a building. That is, in Embodiment 1, the movement determining section 12 determining whether or not the user has moved from the building is triggered by the acceleration of the mobile terminal device 1 being not zero.

In the configuration of Embodiment 3, no trigger is employed. Instead, the movement determining section 12 determines whether or not the user has moved from a building, solely on the basis of current position information obtained from the position information acquiring section 60. That is, the movement determining section 12 of Embodiment 3 determines that the user has moved from the building in a case where the mobile terminal device 1 is distanced from the position of the building by the predetermined distance or greater, regardless of whether or not the acceleration of the mobile terminal device 1 is zero.

The mobile terminal device 1 of Embodiment 3 does not need to include the acceleration detecting section 50. This makes it possible to simplify the configuration of the mobile terminal device 1.

[Software Implementation Example]

A control block of the mobile terminal device 1 (in particular, the position determining section 11, the movement determining section 12, the time determining section 13, and the positional relationship information generating section 14) can be realized by a logic circuit (hardware) provided in an integrated circuit (IC chip) or the like or can be alternatively realized by software as executed by a central processing unit (CPU).

In the latter case, the mobile terminal device 1 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recapitulation]

An information processing device (control section 10) in accordance with Aspect 1 of the present invention includes: a first determination section (position determining section 11) configured to determine whether or not a user is staying at a specific position; a detection section (movement determining section 12) configured to detect the user having moved from the specific position; a second determination section (time determining section 13) configured to determine whether or not a predetermined length of time or greater has elapsed between a first time point and a second time point, the first time point being a time point at which the first determination section determines that the user is staying at the specific position, the second time point being a time point at which the detection section detects the user having moved from the specific position; and an information presenting section (positional relationship information generating section 14) configured to present information in a case where the second determination section determines that the predetermined length of time or greater has elapsed between the first time point and the second time point, the information indicating a positional relationship between a current position of the user and a specific place.

With the configuration, the information indicating the positional relationship between (i) the user of (and the information processing device) and (ii) the specific place is displayed in a case where the user has stayed at the specific position for the predetermined length of time or greater. The user can travel toward the specific place by referring to the information thus presented. The predetermined length of time is set to be an arbitrary length of time, in accordance with the possibility of the user travelling toward the specific place upon leaving the specific position after a given length of stay there.

Note that the specific position can be a position at which a building exists. Furthermore, the specific place can be, for example, (i) the nearest train station to the user (and to the information processing device) or (ii) a facility (or a plurality of facilities) via which the user can utilize a means of transportation (of one type or a plurality of types).

In Aspect 2 of the present invention, the information processing device of Aspect 1, can be arranged such that the information presenting section presents at least one of (i) information indicating a distance as measured from (a) the current position of the user to (b) the specific place and (ii) information indicating a direction of the specific place as seen from the current position of the user.

The configuration makes it possible for the user to check information indicating the distance from the user's current position to the specific place, and thereby decide whether to travel to the specific place on foot or by a means of transportation (by taxi, for example). The configuration also makes it possible for the user get to the specific place by (i) checking information indicating the direction of the specific place, as seen from the user's current position, and (ii) subsequently travelling in the direction.

In Aspect 3 of the present invention, the information processing device of Aspect 1 or Aspect 2 can be arranged such that the specific place is a specific facility or a specific location, any of which exists within a predetermined distance from the current position of the user.

With the configuration, the information processing device presents information indicating the positional relationship between (i) the specific facility or location existing within the predetermined distance from the current position of the user and (ii) the user. This enables the user to obtain information necessary to travel to the specific facility or location by referring to the present information. The predetermined distance can be a distance considered acceptable for travelling on foot (for example, 2 km).

In Aspect 4 of the present invention, the information processing device of any one of Aspects 1 through 3, can be arranged so as to further. Include an acceleration detecting section (50) configured to detect an acceleration of the information processing device, the detection section determining that the user has moved from the specific position in a case where (i) the acceleration of the information processing device as detected by the acceleration detecting section is not less than a predetermined value and (ii) a distance between the information processing device and the specific position is not less than a predetermined distance.

With the configuration, the information processing device determines that the user has moved from the specific position in a case where (i) the acceleration of the information processing device is not less than a predetermined value and (ii) the distance between the information processing device and a building is not less than the predetermined distance. This makes it possible to detect, with a high degree of accuracy, the user (and the information processing device) having moved or having left the specific position.

A method in accordance with Aspect 5 of the present invention includes the steps of: (a) determining whether or not a user is staying at a specific position; (b) detecting the user having moved from the specific position, the step (b) being carried out after it has been determined in the step (a) that the user is staying at the specific position; (c) determining whether or not a predetermined length of time or greater has elapsed between a first time point and a second time point, the first time point being a time point at which it is determined in the step (a) that the user is staying at the specific position, the second time point being a time point of detection of the user having moved in the step (b); and (d) presenting information in a case where it has been determined, in the step (c), that the predetermined length of time or greater has elapsed between the first time point and the second time point, the information indicating a positional relationship between a current position of the user and a specific place.

The configuration brings about an effect similar to the information processing device of Aspect 1.

The information processing device in accordance with the foregoing aspects of the present invention may be realized by a computer. In such a case, the present invention encompasses: a control program for the information processing device which program causes a computer to operate as each section of the information processing device so that the information processing device can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention can be applied to, for example, a mobile computer, a smartphone, a mobile phone other than a smartphone, and a PDA (Personal Digital Assistant).

REFERENCE SIGNS LIST

10 Control section (information processing device)
11 Position determining section (first determination section)
12 Movement determining section (detection section)
13 Time determining section (second determination section)
14 Positional relationship information generating section (information presenting section)
50 Acceleration detecting section

The invention claimed is:

1. An information processing device comprising:
a first determination section determining whether or not a user is staying at a specific position;
a detection section detecting the user having moved from the specific position;
a second determination section determining whether or not a predetermined length of time or greater has elapsed between a first time point and a second time point, the first time point being a time point at which the first determination section determines that the user is staying at the specific position, the second time point being a time point at which the detection section detects the user having moved from the specific position;
an information presenting section presenting information in a case where the second determination section determines that the predetermined length of time or greater has elapsed between the first time point and the second time point, the information indicating a positional relationship between a current position of the user and a specific place; and
an acceleration detecting section detecting an acceleration of the information processing device;
wherein the detection section determining that the user has moved from the specific position in a case where (i) the acceleration of the information processing device as detected by the acceleration detecting section is not less than a predetermined value and (ii) a distance between the information processing device and the specific position is not less than a predetermined distance.

2. The information processing device as set forth in claim 1, wherein the information presenting section presents at least one of (i) information indicating a distance as measured from (a) the current position of the user to (b) the specific place and (ii) information indicating a direction of the specific place as seen from the current position of the user.

3. The information processing device as set forth in claim 1, wherein the specific place is a specific facility or a specific location, any of which exists within a predetermined distance from the current position of the user.

4. A method comprising the steps of:
(a) determining whether or not a user is staying at a specific position;
(b) detecting the user having moved from the specific position, the step (b) being carried out after it has been determined in the step (a) that the user is staying at the specific position;
(c) determining whether or not a predetermined length of time or greater has elapsed between a first time point and a second time point, the first time point being a time point at which it is determined in the step (a) that the user is staying at the specific position, the second time point being a time point of detection of the user having moved in the step (b);
(d) presenting information in a case where it has been determined, in the step (c), that the predetermined length of time or greater has elapsed between the first time point and the second time point, the information indicating a positional relationship between a current position of the user and a specific place; and
(e) detecting an acceleration of the user;
(f) determining that the user has moved from the specific position in a case where (i) the acceleration of the user as detected is not less than a predetermined value and (ii) a distance between the user and the specific position is not less than a predetermined distance.

* * * * *